United States Patent Office 3,170,896
Patented Feb. 23, 1965

3,170,896
PROCESS FOR ACYLATING POLYOXY-
METHYLENES
Kuno Wagner, Leverkusen, and Helmuth Kritzler,
Cologne-Flittard, Germany, assignors to Farben-
fabriken Bayer Aktiengesellschaft, Leverkusen,
Germany, a corporation of Germany
No Drawing. Filed Jan. 12, 1960, Ser. No. 1,856
Claims priority, application Germany, Jan. 16, 1959,
F 27,489
7 Claims. (Cl. 260—67)

This invention relates to high molecular weight polyoxymethylenes and more especially to an improved process of acylating such polyoxymethylenes.

The acylation of polyoxymethylenes with organic acid anhydrides in the presence of acylation catalysts such as zinc chloride or sulphuric acid and substances with a buffering action, such as sodium acetate, or acid-fixing agents, such as tertiary organic bases, is already known (H. Staudinger, "Die hochmolekularen organischen Verbindungen," Verlag Jul. Springer, Berlin, 1932, page 277).

With this working method it is not possible, even under the gentlest conditions, to exclude a degradation of the polyoxymethylene chains (H. Staudinger and collaborators, Liebigs Ann. Chem. 474, page 175 (1929)). As the heating period is increased, for example, when acetylating with acetic anhydride, more of the mainly interesting reaction products of medium molecular weight, (which are filamentary and show relatively high elasticity), are destroyed, even in the presence of pyridine as an acid-fixing agent. In order to prevent this degradation, attempts have been made to limit the time of acetylation to not more than a few hours or even to limit further to half to one hour (Liebigs Ann. Chem. loc. cit.). However, even with these short reaction times, it is not possible to avoid an appreciable degradation or loss of yield of higher molecular weight polyoxymethylenes with the formation of readily soluble low-molecular and valueless oligomeric polyoxymethylene diacetates. For example, with gentle acetylation in neutral solvents such as di-methyl formamide at about 140° C., it is usually not possible to prevent a loss in yield of at least 16 percent after 1 hour. Likewise, a heterogeneous acetylation usually proceeds with a similar loss in yield; in addition, since this topochemical reaction proceeds more slowly with high-molecular polyoxymethylene crystallites, no completely reacted products are obtained in the short reaction times which are permissible. Instead the product comprises mixtures of diacetates, acetate hydrates and un-modified polyoxymethylene dihydrates (H. Staudinger "Die hochmolekularen organischen Verbindungen" Verlag Jul. Springer (1932), page 233). If an attempt is made to carry out a more thorough acetylation under high pressure and at temperatures near the melting temperature of the polyoxymethylenes, the loss in yield of the valuable products usually exceeds 50 percent. This loss is further increased when acylation is performed with other less reactive acid anhydrides.

It has now been found that it is possible to effect acylation of high molecular weight polyoxymethylenes practically without any loss in yield of valuable final products, and in certain cases to obtain at the same time a controlled degradation of the polyoxymethylene chain, if the acylation of the polyoxymethylenes is effected in the presence of carbodiimides.

Suitable carbodiimides for carrying out the process of the invention are carbodiimides of the aliphatic, cycloaliphatic, araliphatic and aromatic series, both of symmetrical and asymmetrical structure. Suitable carbodiimide correspond for instance to general formula:

$$R_1-N=C=N-R_2$$

in which $R_1$ and $R_2$ stand for an alkyl group having 1 to 20, preferably 2 to 6 carbon atoms (methyl, ethyl, n-propyl, iso-propyl, n-butyl, tertiary butyl, hexyl, dodecyl, octadecyl), an aromatic group (phenyl, tolyl, ethyl phenyl, nitrophenyl, chlorophenyl, alkoxy phenyl such as methoxyphenyl, ethoxyphenyl), naphthyl, a cycloaliphatic group (cyclohexyl, methylcyclohexyl, cyclopentyl) an araliphatic group (benzyl). Examples of such compounds are diethyl carbodiimide, dicyclohexyl carbodiimide, methyl-n-propyl carbodiimide, dibenzyl carbodiimide, diphenyl carbodiimide and dinaphthyl carbodiimide, or substituted derivatives of the said carbodiimides. In addition, it is likewise possible to employ polyfunctional carbodiimides that is to say organic compounds which contain at least two groups of the formula —N=C=N— each free valency of the nitrogen atoms being saturated by a carbon atom forming part of an aliphatic, cycloaliphatic, araliphatic or aromatic hydrocarbon radical in which the aromatic groups may be substituted besides by hydrocarbon radicals by nitro halogen or alkoxy groups. Compounds of this type correspond for instance to the general formula $R_2-N=C=N-R-N=C=N-R_1$, in which formula $R_2$ and $R_2$ have the same meaning as above and R stands for a bivalent organic radical such as alkylene having 2 to 8 carbon atoms, six membered cycloalkylene, which may be substituted by lower alkyl, arylene such as phenylene, naphthylene which may be substituted as above, aralkylene such as xylylene. Examples of such carbodiimides are tetramethylene $\omega,\omega'$-bis-tert.-butyl carbodiimide and hexamethylene $\omega,\omega'$-bis-tert.-butyl carbodiimide are mentioned as examples.

It is advantageous to use carbodiimides which comprise at least one nitrogen atom which in its turn is bonded to a secondary or tertiary carbon atom, such as for example methyl tert-butyl carbodiimide, tertiary butyl isopropyl carbodiimide and others. Carbodiimides of this structure comprise a substantially smaller tendency to self-polymerisation than aromatically substituted carbodiimides. Furthermore, their reaction products with acids to give acylated ureas show no tendency to form aromatic isocyanates at elevated temperatures.

Acylation processes with representatives of the aforesaid class of substances can be carried out in conjunction with the conventional acylation agents, i.e. aliphatic, cycloaliphatic, araliphatic and aromatic carboxylic acid anhydrides, anhydrides of monocarboxylic acids having 1 and 20 carbon atoms and being devoid of non-benzeneoid unsaturation, such as acetic anhydride, propionic anhydride, stearic anhydride, benzoic anhydride, cyclohexyl carboxylic acid anhydride, phenylacetic acid anhydride as well as substituted derivatives of these acid anhydrides and mixtures of these anhydrides with one another as well as mixed anhydrides such as the mixed anhydride of acetic and propionic acid, it being preferred to use acetic anhydride.

The process is quite generally applicable to all polyoxymethylenes but only substances with average molecular weights corresponding to an intrinsic viscosity of at least 0.4 (as measured in a 0.5 percent solution in dimethylformamide at 150° C.) are of technical interest.

The acylation can be carried out in heterogeneous reaction, in which the acylation agent serves as reaction medium in the presence of an inert liquid which has no swelling action on the polymer or in the presence of solvent agent which is applied in such amounts that it either dissolves or swells the polymer. The swelling is effected with a quantity of solvent which is insufficient for complete dissolution. Suitable solvents for this purpose are: diacylated thiodiglycol such as thiodiglycol diacetate or propionate, diacylated polythioethers of the formula $$HO.CH_2.CH_2.S.CH_2.CH_2.(O.CH_2.CH_2.S.CH_2.CH_2)_n.OH$$

in which $n$ is a whole integer of about 1 to 20 and polyglycolethers having a molecular weight of about 300 to 2000, dimethyl formamide, dimethyl acetamide, tetramethyl urea, disubstituted malonic acid alkyl esters such as α-dimethyl or diethyl malonic acid diesters with methanol or ethanol, and esters of phenyl ethyl alcohol with monocarboxylic acids such as acetic or propionic acid.

There is no strict upper limit for the quantity of carbodiimide to be used, but in most cases 0.5 to 10, preferably 3 to 6 parts by weight of a carbodiimide can be used for every 100 parts by weight of acid anhydride. The quantity of acid anhydrides can vary within wide limits and it depends on the molecular weight of the polyoxymethylenes, the swelling power thereof, the stirring speed and similar factors. Generally speaking, it is advantageous to use 2 to 20, preferably 5 to 20 parts by weight of acid anhydride per part by weight of polyoxymethylene.

As regards reaction time and temperature, the range from ½ to 50 hours being preferred as regards the former and the range from 50 to 200° C., especially 100 to 150° C. as regards the latter. Furthermore, it is advisable in many cases to work in an inert gas atmosphere, such as nitrogen, argon, helium, methane, ethane, propane. In order to increase the reaction velocity during acylation, it is desirable for catalytic quantities of tertiary organic nitrogen bases, salts of the alkali metals and/or alkaline earth metals with weak organic acids and the like to be added to the mixtures in known manner. Such catalysts are for instance sodium acetate, propionate, stearate or the corresponding potassium salts, secondary sodium phosphate, trimethylamine, triethylamine, dimethylbenzylamine, peralkylated polyalkylene polyamines and alkylenediamines, pyridine, N-methyl morpholine. The salts are usually applied in amounts of about 0.1 to 5, and the nitrogen bases in amounts of about 0.1 to 50 parts by weight per 100 parts by weight polymer.

According to another embodiment of the process, it is possible to effect the acylation in the presence of carbodiimides at temperatures above 100° C. and under elevated pressure up to about 50 atmospheres. When working at temperatures above 150° C. a thermal degradation of polyoxymethylenes may simultaneously be obtained from the viscosity range above 1.9 into those of the range 0.5 to 1.6.

As shown above the acylation may be carried through in the presence of inert organic liquids which do neither swell nor dissolve the polymers. Suitable liquids of this type are aliphatic and aromatic hydrocarbons which may be halogenated, such as decaline, cyclohexane, benzene, toluene, xylene, these liquids being preferably used in amounts of about 0.1 to 2 parts by weight per 1 part by weight of polymer. When the reaction is to be carried out in solution, the above cited solvents such as thiodiglycoldiacetate may be used in amounts of 6 to 30 parts by weight per 1 part of polymer whereas with the application of about 0.5 to 5 parts in most cases only swelling of the polymer occurs.

The surprisingly great influence of carbodiimides on the favourable progress of the acylation reaction becomes obvious from the following comparison. Whereas a loss in yield of 21 percent is obtained when reacting acetic anhydride with a high-molecular polyoxymethylene of the intrinsic viscosity of 1.9 (measured in a 0.5 percent dimethyl formamide solution at 150° C.) in the presence of sodium acetate, pyridine and the like at 139° C. in a time interval of 1 and a half hours, the same reaction in the presence of small quantities (about 5 percent by weight) of for example diisopropyl carbodiimide does not lead to any detectable loss in yield. With an acetylation period of 13 hours in the absence of carbodiimide, a loss in yield of about 40 percent is recorded. While, on adding carbodiimides the loss in yield is practically avoided and only a small drop in the internal viscosity is found. At 174° C. and at elevated pressure, the loss in yield of valuable high-molecular polyoxymethylenes is almost 60 percent when the acetylation period is 1 and a half hours without carbodiimide and the internal viscosity has fallen to about 0.4, and the products yield brittle and unusable fusible elements. Whereas, in the presence of carbodiimides, the loss in yields is only 6 percent, i.e. 94 percent of substance of high molecular weight is still obtained, the intrinsic viscosity of the products in dimethyl formamide has fallen from 1.9 to 0.9 and so a viscosity range has been reached which covers the most valuable molecular weight range of the polyoxymethylenes.

Possibly, due to the presence of carbodiimides, the degradation of the polyoxymethylene chains by traces of acids is practically prevented, so that it is only possible for the much slower degradation by thermal degradation to take place. This slow degradation is however often advantageous, since it is possible in this way to progress from the high molecular weight range of the polyoxymethylenes, which are difficult to work, have less elasticity and are not filamentary, to a range which is characterised by filamentary properties of the products and improved elasticity. This range is substantially at an intrinsic viscosity of 0.6 to 1.6 in dimethyl formamide. These products furthermore present considerably more advantageous processing properties on account of their better flowing capacity.

The acetylated polyoxymethylenes which can be produced by the process of the invention constitute valuable products for the production of plastic compounds, which can in certain cases be shaped with or without addition of plasticizers, fillers, stabilizers and the like.

The parts indicated in the following examples represent parts by weight, unless otherwise indicated.

*Example 1*

10 parts of a high molecular weight polyoxymethylene having an intrinsic viscosity of 1.9 (measured in a 0.5 percent dimethyl formamide solution at 150° C.) are 200 parts of acetic anyhdride, 7 parts of diisopropyl car- 200 parts of acetic anyhdride, 7 parts of diisopropyl carbodiimide and 0.5 part of sodium acetate in a nitrogen atmosphere for 15 hours at 137 to 139° C. The acetylated polyoxymethylene is filtered off from the cooled reaction solution, carefully freed from acetic anhydride by washing several times with acetone and methanol and also freed from traces of sodium acetate by washing with water and is carefully dried after having again been treated with acetone. A stabilised polyoxymethylene is obtained without any appreciable loss in yield because of formation of readily soluble polyoxymethylene diacetates of low molecular weight. Yield: 9.7 g.=97 percent of the quantity used.

If the same reaction is carried out under the same conditions but without any diisopropyl carbodiimide and heterogeneously acetylation occurs as above for 15 hours at 137 to 139° C., a loss yield of 45 percent is obtained when working up and drying are effected in the same way.

*Example 2*

10 parts of a high molecular weight polyoxymethylene (as in Example 1) are dissolved in a mixture of 200 parts of thiodiglycol diacetate and 100 parts of acetic anhydride, 5 parts of diisopropyl carbodiimide and 0.4 part of sodium acetate at 155 to 156° C. to form a highly viscous solution. This solution is acetylated for 4 hours while maintaining this temperature. After working up and purifying in accordance with Example 1, the polyoxymethylene which is used is obtained almost quantitatively in acetylated form.

If the acetic anhydride referred to in Example 2 is replaced by 60 parts of benzoic anhydride, a stabilised polyoxymethylene is likewise obtained without any appreciable loss in yield after working up and drying in analogous manner.

Example 3

50 parts of the high molecular weight polyoxymethylene as used in Example 1 are acetylated with 500 parts of acetic anhydride, 0.8 part of sodium acetate and 25 parts of diisopropyl carbodiimide for 90 minutes under nitrogen at 160° C. and under a pressure of 9 to 10 atmosphere gauge. After the stabilised high molecular weight polyoxymethylene has been purified and dried as in Example 1, 49 parts thereof are obtained without any great loss in yield (loss in yield is 1 g.=2 percent of the quantity introduced).

If by way of comparison the corresponding acetylation is carried out without adding diisopropyl carbodiimide but in other respects using the same components, an appreciable loss in yield is observed due to the formation of valueless polyoxymethylene diacetates and the formation of readily soluble and distillable polyoxymethylene diacetates (loss in yield is 22 parts=44 percent).

Example 4

The procedure set out in Example 3 is followed, using the same components and quantities, but the acetylation is carried out near the melting temperature of the polyoxymethylene used (at 174° C.) under a nitrogen atmosphere and a pressure of 10 atmosphere gauge. After working up and drying, 46 parts by weight of stabilised polyoxymethylene are obtained. The loss in yield in this case is only about 8 percent. The intrinsic viscosity of the acetylated polyoxymethylene returns to 0.9 (measured in dimethyl formamide at 150° C.) The products can easily be fused, are filamentary, elastic and tough, and can be processed substantially more easily than the initial product because they have a better flowing power.

If the same experiment is carried out without the use of diisopropyl carbodiimide, a loss in yield of 57 percent is obtained after acetylating for 30 minutes, due to the formaiton of unusable low molecular weight polyoxymethylene diacetates. The isolated high molecular weight polyoxymethylene, the initial viscosity (intrinsic viscosity) of which is 1.8, shows a further drop in the intrinsic viscosity to below 0.4 after acetylation, i.e. corresponding to a molecular weight range in which the valuable properties of the polyoxymethylenes have been lost.

Example 5

10 parts of a high molecular weight polyoxymethylene having an intrinsic viscosity of 1.2 (measured in a 0.5 percent dimethylformamide solution at 150° C.) are contacted for 10 hours at 137 to 139° C. in a nitrogen atmosphere with 200 parts of acetic acid anhydride, 10 parts of dicyclohexyl carbodiimide and 0.4 parts of sodium acetate. The acetylated polyoxymethylene obtained is separated from the reaction mixture after cooling it to room temperature by filtration, freed from acetic anhydride by washing it several times with acetone and methanol and from sodium acetate by washing it with water. Thereafter, it is washed once more with acetone and dried at room temperature. Yield 9.8 parts (=98 percent as calculated on the polyoxymethylene applied); softening point 173 to 174° C.

Example 6

20 parts of a high molecular weight polyoxymethylene having an intrinsic viscosity of 1.4 (measured in a 0.5 percent solution in dimethylformamide at 150° C.) are treated for 10 hours at 137 to 139° C. under nitrogen with 300 parts of propionic anhydride, 10 parts of tertiary butyl-isopropyl carbodiimide and 0.4 parts of potassium acetate. The reaction mixture obtained is worked up as in Example 5. Yield 19.6 parts (=98 percent as calculated on the polyoxymethylene applied).

Example 7

10 parts of a high molecular weight polyoxymethylene of an intrinsic viscosity of 0.95 (measured in a 0.5 percent solution in dimethylformamide at 150° C.) are treated for 5 hours at 137 to 139° C. under nitrogen with 300 parts acetic anhydride, 8 parts of diphenyl carbodiimide and 5 parts of dimethyl benzylamine. The reaction mixture is worked up as shown in Example 5. Yield of acetylated polyoxymethylene 9.7 parts (=97 percent as calculated on the polyoxymethylene applied); softening point 173.5 to 174.5° C.

The high molecular weight polyoxymethylenes used for carrying through the process of the present invention are produced by polymerizing liquid or gaseous formaldehyde which is practically free of water in an inert solvent in the presence of polymerization catalysts, as for instance teritary amines, metal salts (such as potassium stearates) metal oxides (such as aluminum oxides) at temperatures between about −100 and +70° C. Such processes have for instance been disclosed by Staudinger, Walker and in the copending application Serial No. 813,629 filed May 18, 1959, now Patent 3,005,799 (Belgian Patent No. 579,267).

What is claimed is:

1. In a process of acylating high molecular weight polyoxymethylenes by reacting them at elevated temperature with an anhydride of a carboxylic acid, the improvement comprising conducting the reaction in the presence of about 0.5 to 10 parts by weight per 100 parts by weight of said anhydride of a carbodiimide selected from the group consisting of aliphatic, cycloaliphatic, aromatic and araliphatic carbodiimides, and a basic acylating catalyst selected from the group consisting of tertiary organic nitrogen bases, basic alkali metal salts, and basic alkaline earth metal salts.

2. The process of claim 1 wherein said acylating catalyst is employed in amounts of about 0.1–5 parts in the case of the salts, and in an amount of 0.1–50 parts in the case of the tertiary organic nitrogen bases, said parts being by weight per 100 parts by weight of polyoxymethylene.

3. The process of claim 1 wherein the carbodiimide is diisopropyl carbodiimide.

4. The process of claim 1 wherein the carbodiimide is tert-butyl isopropyl carbodiimide.

5. The process of claim 1 wherein the carbodiimide is methyl tert-butyl carbodiimide.

6. The process of claim 1 wherein the carbodiimide is dicyclohexyl carbodiimide.

7. The process of claim 1 wherein the carbodiimide is diphenyl carbodiimide.

References Cited in the file of this patent

UNITED STATES PATENTS

| 2,686,180 | Schmidt et al. | Aug. 10, 1954 |
| 2,998,409 | Nogare et al. | Aug. 29, 1961 |

FOREIGN PATENTS

| 770,717 | Great Britain | Mar. 20, 1957 |